(12) United States Patent
Hayashi (10) Patent No.: US 8,944,581 B2
(45) Date of Patent: Feb. 3, 2015

(54) WATER-BASED INK FOR INK-JET RECORDING, INK CARTRIDGE, INK-JET RECORDING APPARATUS, AND INK-JET RECORDING METHOD

(71) Applicant: Chisato Hayashi, Marugame (JP)

(72) Inventor: Chisato Hayashi, Marugame (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/036,274

(22) Filed: Sep. 25, 2013

(65) Prior Publication Data

US 2014/0132660 A1 May 15, 2014

(30) Foreign Application Priority Data

Nov. 15, 2012 (JP) ................................ 2012-251526

(51) Int. Cl.
*C09D 11/00* (2014.01)
*C09D 11/322* (2014.01)
*B41J 2/21* (2006.01)
*B41J 2/01* (2006.01)

(52) U.S. Cl.
CPC .............. *C09D 11/322* (2013.01); *B41J 2/01* (2013.01); *B41J 2/2107* (2013.01)
USPC ............................................. 347/100; 347/95

(58) Field of Classification Search
CPC ...... C09D 11/322; C09D 11/40; C09D 11/38; C09D 11/324; C09D 11/36; C09D 11/30; C09D 11/328; C09D 11/101; C09D 11/005; C09D 11/54; C09D 11/52; C09C 1/56; B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; B41M 5/0011; B41M 5/0017; B41M 7/00
USPC ...................... 347/100, 95, 96, 101, 102, 20; 106/31.6, 31.13, 31.27
See application file for complete search history.

(56) References Cited

U.S. PATENT DOCUMENTS

| | | | |
|---|---|---|---|
| 7,247,196 | B2 | 7/2007 | Sato et al. |
| 8,475,579 | B2 | 7/2013 | Chen et al. |
| 2006/0146108 | A1 | 7/2006 | Sato et al. |
| 2008/0241398 | A1 | 10/2008 | Kato et al. |
| 2011/0297040 | A1 | 12/2011 | Chen et al. |
| 2012/0081459 | A1* | 4/2012 | Sugimoto et al. ............... 347/21 |
| 2014/0055534 | A1* | 2/2014 | Hayashi ........................... 347/86 |
| 2014/0132680 | A1* | 5/2014 | Hayashi ........................... 347/86 |

FOREIGN PATENT DOCUMENTS

| | | | |
|---|---|---|---|
| JP | 2002-020664 A | 1/2002 | |
| JP | 2002-327141 A | 11/2002 | |
| JP | 2002327141 A | * 11/2002 | ............. C09D 11/00 |

(Continued)

*Primary Examiner* — Manish S Shah
(74) *Attorney, Agent, or Firm* — Banner & Witcoff, Ltd.

(57) ABSTRACT

There is provided a water-based ink for ink-jet recording, including: a self-dispersible pigment modified by sulfonic acid group; glycerol; diethylene glycol; a penetrant; and water, wherein the glycerol and the diethylene glycol satisfy the following condition (i):

0.01≤DEG/(Gly+DEG)≤0.11 (i)

in the condition (i), Gly represents an amount of the glycerol in the water-based ink (% by weight); and DEG represents an amount of the diethylene glycol in the water-based ink (% by weight).

16 Claims, 1 Drawing Sheet

(56) References Cited

FOREIGN PATENT DOCUMENTS

| JP | 2003-041178 A | 2/2003 |
|---|---|---|
| JP | 2003-268277 A | 9/2003 |
| JP | 2006-096990 A | 4/2006 |
| JP | 2008-246821 A | 10/2008 |
| JP | 2011-225759 A | 11/2011 |
| JP | 2011-252150 A | 12/2011 |

* cited by examiner

WATER-BASED INK FOR INK-JET RECORDING, INK CARTRIDGE, INK-JET RECORDING APPARATUS, AND INK-JET RECORDING METHOD

CROSS REFERENCE TO RELATED APPLICATION

The present application claims priority from Japanese Patent Application No. 2012-251526, filed on Nov. 15, 2012, the disclosure of which is incorporated herein by reference in its entirety.

BACKGROUND OF THE INVENTION

1. Field of the Invention

The present invention relates to a water-based ink for ink-jet recording, an ink cartridge, an ink jet recording apparatus, and an ink jet recording method.

2. Description of the Related Art

It is important for a water-based ink for ink-jet recording to suppress viscosity increase and solidification due to drying in order to discharge the water-based ink stably. Thus, a humectant (antidrying agent) is generally used in the water-based ink for ink jet recording. There have been suggested, for example, a water-based ink for ink jet recording in which glycerol is used as the humectant (Japanese Patent Application laid-open No. 2011-225759) and a water-based ink for ink jet recording in which diethylene glycol is used as the humectant (Japanese Patent Application laid-open No. 2006-96990 corresponding to United States Patent Application Publication No. 2006/0146108).

However, the water-based ink for ink jet recording in which the diethylene glycol is used has the following problem. That is, although the diethylene glycol has a low viscosity, the diethylene glycol is relatively high-volatile compared with other humectants. Thus, the diethylene glycol is volatized due to drying. Therefore, the water-based ink for ink jet recording in which the diethylene glycol is used can not obtain the viscosity-increase suppressing effect after the drying sufficiently. For the water-based ink for ink jet recording in which the glycerol is used, since the volatility of glycerol is lower than that of diethylene glycol, solidification is suppressed by the glycerol even when moisture or water content is lost due to the drying. However, the viscosity of glycerol is relatively high, and thus the viscosity-increase suppressing effect after the drying is not enough. As described above, both the water-based ink for ink-jet recording in which the glycerol is used and the water-based ink for ink-jet recording in which the diethylene glycol is used have the insufficient viscosity-increase suppressing effects after the drying. Thus, the water-based ink for ink-jet recording in which the glycerol or the diethylene glycol is used is required to further suppress the viscosity increase after the drying. In order to stably discharge the ink by suppressing the viscosity increase after the drying, it is necessary that both jetting stability after an ink-jet recording apparatus is not used and is left for a short period of time (for example, a few seconds to several tens of seconds) (short-term drying) and jetting stability after the ink-jet recording apparatus is not used and is left for a long period of time (for example, a month to a few months) (long-term drying) are superior.

SUMMARY OF THE INVENTION

In view of the above, an object of the present teaching is to provide a water-based ink for ink jet recording in which viscosity increases after a short-term drying and a long-term drying are suppressed.

According to a first aspect of the present teaching, there is provided a water-based ink for ink-jet recording, including a self-dispersible pigment modified by sulfonic acid group, glycerol, diethylene glycol, a penetrant, and water, wherein the glycerol and the diethylene glycol satisfy the following condition (i):

$$0.01 \leq DEG/(Gly+DEG) \leq 0.11 \quad (i)$$

in the condition (i), Gly represents an amount of the glycerol in the water-based ink (% by weight); and DEG represents an amount of the diethylene glycol in the water-based ink (% by weight).

According to a second aspect of the present teaching, there is provided an ink cartridge containing the water-based ink for ink-jet recording as defined in the first aspect.

According to a third aspect of the present teaching, there is provided an ink jet recording apparatus including: an ink accommodating section in which the water-based ink for ink jet recording as defined in the first aspect is accommodated; and an ink discharge mechanism which is configured to discharge the water-based ink for ink jet recording accommodated in the ink accommodating section.

According to a fourth aspect of the present teaching, there is provided an ink jet recording method including: preparing a recording medium; and discharging the water-based ink for ink jet recording as defined in the first aspect onto the recording medium.

DESCRIPTION OF THE PREFERRED EMBODIMENTS

The degree of viscosity increase of the water-based ink for ink-jet recording (hereinafter referred to as "water-based ink" or "ink" in some cases) after a short-term drying and the degree of viscosity increase of the water-based ink for ink-jet recording after a long-term drying can be evaluated, for example, by using viscosity of the water-based ink after evaporation in a low shear area and viscosity of the water-based ink after evaporation in a high shear area as indexes. The viscosity of the water-based ink after the evaporation in the low shear area is used as an index of performance required when the water-based ink is redischarged from an ink discharge mechanism of an ink-jet recording apparatus after the long-term drying. As the viscosity of the water-based ink after the evaporation in the low shear area is lower, the viscosity increase of the water-based ink after the long-term drying is further suppressed, and thereby making it possible to provide a superior jetting stability after the long-term drying. The viscosity of the water-based ink after the evaporation in the high shear area is used as an index of performance required when the water-based ink is redischarged from the ink discharge mechanism of the ink jet recording apparatus after the short-term drying. As the viscosity of the water-based ink after the evaporation in the high shear area is lower, the viscosity increase of the water-based ink after the short-term drying is further suppressed, and thereby making it possible to provide a superior jetting stability after the short-term drying. The viscosity of the water-based ink after the evaporation in each of the low shear area and the high shear area can be measured, for example, by a method explained in Examples which will be described later. The low shear area means, for example, an area in which a shear velocity is not more than 10 sec$^{-1}$ (more specifically 1 sec$^{-1}$ to 10 sec$^{-1}$). By measuring the viscosity in the low shear area, viscosity corresponding to the viscosity after the long-term drying can be evaluated. The high shear area means, for example, an area in which the shear velocity is not less than 100 sec$^{-1}$ (more specifically 100 sec$^{-1}$ to 1000 sec$^{-1}$). By measuring the viscosity in the high shear area, viscosity corresponding to the viscosity after the short-term drying can be evaluated.

An explanation will be made about the water-based ink of the present teaching. The water-based ink of the present teaching includes a colorant, water, and a humectant.

The colorant includes a self-dispersible pigment modified by sulfonic acid group (hereinafter referred to as "sulfonic acid group-modified self-dispersible pigment"). As the sulfonic acid group-modified self-dispersible pigment, it is possible, for example, to use a commercially available product. The commercially available product includes, for example, "CAB-O-JET (trade name) 200", "CAB-O-JET (trade name) 260M", "CAB-O-JET (trade name) 270Y", "CAB-O-JET (trade name) 265M", and "CAB-O-JET (trade name) 250C" produced by Cabot Specialty Chemicals. The water-based ink may contain any polymeric pigment dispersant; or it is allowable that the water-based ink does not contain any polymeric pigment dispersant. In a case that the water-based ink contains the polymeric pigment dispersant, it is preferable that the polymeric pigment dispersant is contained in the water-based ink in an amount to an extent not affecting the viscosity of the water-based ink. As described above, since the sulfonic acid group-modified self-dispersible pigment is used in the water-based ink of the present teaching, the problem of viscosity increase due to the polymeric pigment dispersant does not occur, and the jetting stability and storage stability are superior.

The solid content blending amount of the sulfonic acid group-modified self-dispersible pigment (pigment solid content) with respect to the entire amount of the water-based ink is not particularly limited, and may be appropriately determined based on, for example, desired optical density or color (hue, tint), etc. The pigment solid content is, for example, 0.1% by weight to 20% by weight, is preferably 1% by weight to 15% by weight, and is more preferably 2% by weight to 10% by weight.

The colorant may further contain any other pigment, dye, etc., in addition to the sulfonic acid group-modified self-dispersible pigment; or it is allowable that the colorant does not contain any other pigment, dye, etc. In terms of improving weatherability or weather resistance of a printed matter, it is preferable that the water-based ink of the present teaching does not contain any dye as the colorant. Further, it is preferable that the water-based ink of the present teaching contains only the sulfonic acid group-modified self-dispersible pigment as the colorant substantially. By using only the sulfonic acid group-modified self-dispersible pigment as the colorant, it is possible to further suppress the viscosity increase of the water-based ink after the drying and to further improve the re-dispersion property. In a case that the colorant contains any other pigment or dye other than the sulfonic acid group-modified self-dispersible pigment, the blending amount of any other pigment or dye is preferably not more than 10% by weight with respect to the entire amount of the colorant so as not to affect the effect of the present teaching.

It is preferable that the water is ion exchange water or pure water (purified water). The blending amount of water (water ratio) with respect to the entire amount of the water-based ink is, for example, 10% by weight to 90% by weight, and preferably 40% by weight to 80% by weight. The water ratio may be, for example, the balance of the other components.

The water-based ink contains glycerol and diethylene glycol as the humectant. By using the glycerol and the diethylene glycol in combination as the humectant, the water-based ink of the present teaching has such an advantage that properties of water retention ability of the glycerol and low-viscosity ability of the diethylene glycol are provided effectively. By selecting the sulfonic acid group-modified self-dispersible pigment as the colorant and blending the glycerol and the diethylene glycol to satisfy the following condition (i), it is possible to obtain the water-based ink in which the viscosity increases after the short-term drying and the long-term drying are suppressed.

$$0.01 \leq DEG/(Gly+DEG) \leq 0.11 \quad \text{(i)}$$

Gly: Blending amount of the glycerol with respect to the entire amount of the water-based ink (% by weight)

DEG: Blending amount of the diethylene glycol with respect to the entire amount of the water-based ink (% by weight)

The total blending amount of the glycerol and the diethylene glycol with respect to the entire amount of the water-based ink is, for example, 10% by weight to 60% by weight. By making the total blending amount of the glycerol and the diethylene glycol to be not less than 10% by weight, the viscosity of the water-based ink lowers, wet or moist condition is sufficient, the viscosity increase after the drying is prevented, and volatilization of the water-based ink is suitably suppressed. Further, by making the total blending amount of the glycerol and the diethylene glycol to be not more than 60% by weight, the viscosity increase of the water-based ink is suitably suppressed and the jetting failure is prevented. The total blending amount of the glycerol and the diethylene glycol is preferably 15% by weight to 50% by weight. The blending amount of the glycerol with respect to the entire amount of the water-based ink is, for example, 10% by weight to 55% by weight, preferably 15% by weight to 50% by weight, and more preferably 15% by weight to 40% by weight. The blending amount of the diethylene glycol with respect to the entire amount of the water-based ink is preferably not more than 10% by weight. The humectant may contain any humectant other than the glycerol and the diethylene glycol, but is preferably made only of the glycerol and the diethylene glycol. In a case that the humectant contains any other humectant other than the glycerol and the diethylene glycol, the blending amount of any other humectant is preferably less than 2% by weight, more preferably not more than 1% by weight with respect to the entire amount of the humectant. For each of the glycerol and the diethylene glycol, a content rate of hydroxyl group to molecular weight is high. Thus, the glycerol and the diethylene glycol are more likely to be solvated with component(s) of the pigment and the like, and it is possible to suppress aggregation of the component(s) of the pigment and the like even after the drying. However, triethylene glycol, dipropylene glycol, or the like does not provide the aggregation suppressing effect, because the content rate of hydroxyl group to molecular weight is low.

The glycerol and the diethylene glycol are preferably blended to meet the following condition (ii) instead of the above condition (i). By meeting the following condition (ii), it is possible to obtain the water-based ink in which the viscosity increases after the short-term drying and the long-term drying are further suppressed.

$$0.02 \leq DEG/(Gly+DEG) \leq 0.11 \quad \text{(ii)}$$

Gly: Blending amount of the glycerol with respect to the entire amount of the water-based ink (% by weight)

DEG: Blending amount of the diethylene glycol with respect to the entire amount of the water-based ink (% by weight)

In a case that the sulfonic acid group-modified self-dispersible pigment is used as the colorant and that the condition (i) or condition (ii) for the relation between the blending amount of glycerol and the blending amount of diethylene glycol is satisfied, the effect of suppressing the viscosity increase of the water-based ink after the short-term drying and the viscosity increase of the water-based ink after the long-term drying can be obtained. That is, in a case that the dye, a pigment which is not self-dispersible, a self-dispersible pigment modified by functional group other than sulfonic acid group, or the like is used as the colorant, even when the condition (i) or condition (ii) is satisfied, the effect similar to that of the present teaching can not be obtained. The reason there of is not clear, but it is assumed as follows. That is, it is considered that sulfonic acid ion of the pigment has interaction with hydroxyl group contained in the diethylene glycol or hydroxyl group contained in the glycerol. This interaction is assumed to be mainly a hydrogen bond, and this interaction suppresses aggregation of the sulfonic acid group-modified self-dispersible pigment after evaporation of volatile components in the water-based ink. As a result, it is possible to suppress the viscosity increase of the water-based ink after the short-term drying and the viscosity increase of the water-based ink after the long-term drying.

The humectant other than the glycerol and the diethylene glycol described above is not specifically limited, which includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyether such as polyalkylene glycol; polyhydric alcohols such as alkylene glycol and trimethylolpropane; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, ethylene glycol, propylene glycol, butylene glycol, triethylene glycol, dipropylene glycol, tripropylene glycol, thiodiglycol, and hexylene glycol. One type (kind) of the humectant as described above may be used singly, or two or more types (kinds) of the humectants as described above may be used in combination. Among them, it is preferable to use polyhydric alcohol such as alkylene glycol.

The water-based ink further contains a penetrant. As the penetrant, alkylene glycol monoalkyl ether is preferable. By containing the alkylene glycol monoalkyl ether, the water-based ink having a superior re-dispersion property can be obtained. The re-dispersion property of the water-based ink in the present teaching means, for example, solubility and dispersion property of a solid matter, in a water-based ink, generated after the water-based ink is once evaporated to dryness with resultant solid matter, the solubility and dispersion property being those of when the solid matter is then newly brought in contact with the water-based ink. The re-dispersion property of the water-based ink can be measured, for example, by a method explained in Examples which will be described later.

The alkylene glycol monoalkyl ether may be represented by the following general formula (I):

In the general formula (I), $R^1$ is preferably an unsubstituted straight-chain alkyl group having 1 to 6 carbon atoms and is more preferably an unsubstituted straight-chain alkyl group having 3 to 4 carbon atoms; $R^2$ is preferably an unsubstituted straight-chain alkylene group having 2 to 3 carbon atoms; and n is preferably an integer of 1 to 4 and is more preferably an integer of 2 to 4.

The alkylene glycol monoalkyl ether is exemplified, for example, by ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, tetraethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. The penetrant may include any penetrant other than the alkylene glycol monoalkyl ether, but is preferably made only of the alkylene glycol monoalkyl ether. One type (kind) of the penetrant as described above may be used singly, or two or more types (kinds) of the penetrants as described above may be used in combination.

The penetrant other than the alkylene glycol monoalkyl ether is not specifically limited, and may be any compound having a penetration behavior. The penetrant is exemplified, for example, by surfactants. The surfactant includes anionic surfactants, cationic surfactants, nonionic surfactants, and ampholytic surfactants. Among them, the anionic surfactant and the nonionic surfactant are preferable. The anionic surfactant is exemplified, for example, by alkyl sulfate, alkyl polyoxyethylene sulfate, alkyl benzene sulfonate, and alkyl phosphate. The nonionic surfactant is exemplified, for example, by polyoxyethylene alkyl ether, aliphatic sorbitan ester, and alkyl polyglucoside. In addition to the above surfactants, it is also possible to use surfactants including a fluorine surfactant, a silicone surfactant, and the like as the penetrant.

The mechanism in which the water-based ink having the superior re-dispersion property can be obtained by using the glycerol and the diethylene glycol in combination as the humectant and using the alkylene glycol monoalkyl ether as the penetrant is assumed, for example, as follows. That is, the glycerol has a high hydrophilic property and the diethylene glycol has a hydrophilic property lower than that of the glycerol (the diethylene glycol has a hydrophobic property higher than that of the glycerol). In constituents of the water-based ink such as the surfactant, there is (are) the constituent(s) in which the compatibility with respect to the glycerol is a lot different from the compatibility with respect to the diethylene glycol. In a case that the constituents are used in combination, an insoluble component is extracted after the drying of the water-based ink and the re-dispersion property of the water-based ink is deteriorated in some cases depending on the mixing ratio of the glycerol and the diethylene glycol. In view of this, by further using the alkylene glycol monoalkyl ether in a mixture system of the glycerol and the diethylene glycol in combination, the alkylene glycol monoalkyl ether functions as a compatibility-providing agent to suppress the extraction and to improve the re-dispersion property. This mechanism is just an assumption and the present teaching is not limited thereto.

The blending amount of the penetrant with respect to the entire amount of the water-based ink is, for example, 0% by weight to 20% by weight, preferably 0.1% by weight to 15% by weight, more preferably 0.5% by weight to 10% by weight, and further preferably 1.5% by weight to 3% by weight. Especially, by making the blending amount of the penetrant to be 1.5% by weight to 3% by weight, compatibilizing effect of the penetrant is further improved, and making it possible to further stabilize a dispersion state of pigment particles.

A total blending amount of the self-dispersible pigment modified by sulfonic acid group, the glycerol, the diethylene glycol, and the penetrant with respect to the entire amount of the water-based ink is preferably 10% by weight to 60% by weight, and is more preferably 15% by weight to 50% by weight. In a case that the above total blending amount is less than 10% by weight, the viscosity of ink lowers and there are fears that landing accuracy is decreased and satellite droplets occur. In a case that the above total blending amount exceeds 60% by weight, the viscosity of ink increases and there is a fear that the jetting failure in which the ink is less likely to be discharged from the nozzles occurs.

The water-based ink may further contain conventionally known additives, if necessary. The additive includes, for example, surfactants, pH-adjusting agents, viscosity-adjusting agents, surface tension-adjusting agents, and fungicides. The viscosity-adjusting agent is exemplified, for example, by polyvinyl alcohol, cellulose, and water-soluble resin.

As described above, the water-based ink may contain conventionally known additives, if necessary. The total blending amount of the sulfonic acid group-modified self-dispersible pigment, the glycerol, the diethylene glycol, the penetrant, and water with respect to the entire amount of the water-based ink is preferably 90% by weight to 100% by weight, more preferably 95% by weight to 100% by weight, and most preferably 98% by weight to 100% by weight. In a case that the above total blending amount is 90% by weight to 100% by weight, it is possible to further suppress the viscosity increase of the ink after the drying and to further improve the re-dispersion property.

The water-based ink can be prepared, for example, as follows. That is, the sulfonic acid group-modified self-dispersible pigment, water, the glycerol, the diethylene glycol, and other additive component(s) as necessary are mixed uniformly in accordance with any conventionally known method, and then undissolved matters are removed by a filter or the like.

The viscosity of the water-based ink (viscosity without evaporation) is preferably 2 mPa·S to 10 mPa·S. By making the viscosity of the water-based ink to be not less than 2 mPa·S, jetting control becomes easier and a desired imaging quality can be obtained more easily. By making the viscosity of the water-based ink to be not more than 10 mPa·S, the jetting stability is further improved.

As described above, in the water-based ink for the present teaching, the sulfonic acid group-modified self-dispersible pigment is selected as the colorant, and the glycerol and the diethylene glycol are used in combination at a predetermined blending ratio as the humectant. Thus, viscosity increases after the short-term drying and the long-term drying can be suppressed.

Next, an explanation will be given about an ink cartridge of the present teaching. The ink cartridge of the present teaching is an ink cartridge containing a water-based ink for ink-jet recording, wherein the water-based ink is the water-based ink for ink-jet recording of the present teaching. For example, any conventionally known main body (body) of an ink cartridge can be used for the main body of the ink cartridge of the present teaching.

Next, an explanation will be made about an ink-jet recording apparatus and an ink jet recording method of the present teaching.

The ink-jet recording apparatus of the present teaching is an ink-jet recording apparatus including an ink accommodating section and an ink discharging mechanism which discharges an ink accommodated in the ink accommodating section, wherein the water-based ink for ink-jet recording of the present teaching is accommodated in the ink accommodating section.

The ink jet recording method of the present teaching is an ink jet recording method for performing recording by discharging the water-based ink on a recording medium in an ink jet system, wherein the water-based ink for ink jet recording of the present teaching is used as the water-based ink.

The ink-jet recording method of the present teaching can be performed by using, for example, the ink jet recording apparatus of the present teaching. The recording includes, for example, printing of letters (text), printing of images, printing, etc.

Figure 1:
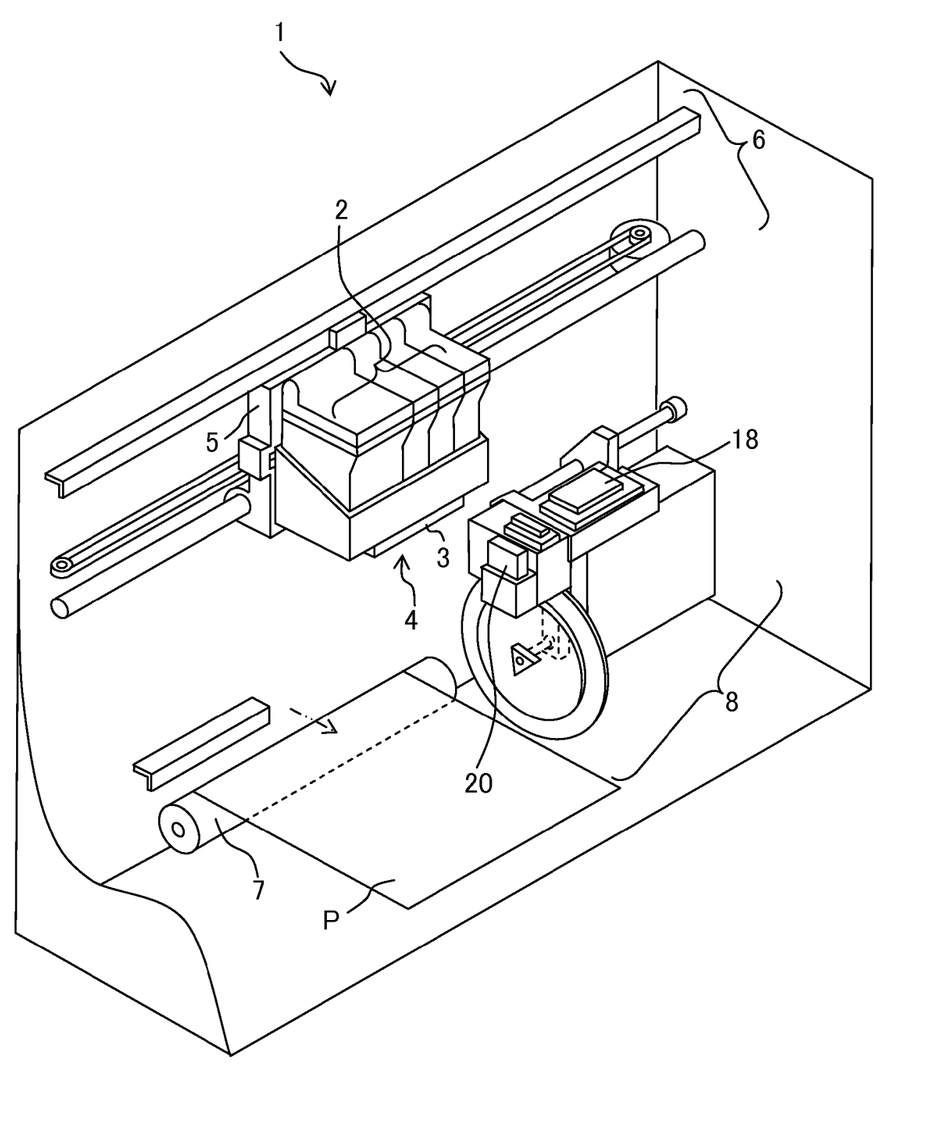
FIG. 1 is a schematic perspective view showing an example of a structure of an ink jet recording apparatus of the present teaching.

FIG. 1 shows an exemplary construction of an ink-jet recording apparatus of the present teaching. As shown in FIG. 1, an ink jet recording apparatus 1 includes, as main constitutive elements, four ink cartridges 2, an ink discharging mechanism (ink jet head) 3, a head unit 4, a carriage 5, a driving unit 6, a platen roller 7, and a purge unit 8.

Each of the four ink cartridges 2 includes one of the four color water-based inks of yellow, magenta, cyan, and black one by one. For example, the water-based black ink is the water-based ink for ink jet recording of the present teaching. General water-based inks may be used for the water-based inks other than the water-based black ink. The ink jet head 3, which is installed on the head unit 4, performs recording on a recording medium P (for example, recording paper). The four ink cartridges 2 and the head unit 4 are carried on the carriage 5. The driving unit 6 reciprocatively moves the carriage 5 in a linear direction. For example, a conventionally known driving unit can be used as the driving unit 6 (see, for example, Japanese Patent Application Laid-open No. 2008-246821 corresponding to United States Patent Application Publication No. US 2008/0241398). The platen roller 7 extends in the reciprocating direction of the carriage 5, and the platen roller 7 is arranged to face or to be opposite to the ink jet head 3.

The purge unit 8 sucks any defective ink containing bubbles or the like remaining at the inside of the ink jet head 3. For example, a conventionally known purge unit can be used as the purge unit 8 (see, for example, Japanese Patent Application Laid-open No. 2008-246821 corresponding to United States Patent Application Publication No. US 2008/0241398).

A wiper member 20 is arranged adjacently to the purge unit 8 at a portion of the purge unit 8 on a side of the platen roller 7. The wiper member 20 is formed to have a spatula-shaped form. The wiper member 20 wipes a nozzle-formed surface of the ink jet head 3 in accordance with the movement of the carriage 5. With reference to FIG. 1, a cap 18 covers a plurality of nozzles of the ink-jet head 3, which is returned to the reset position when the recording is completed, in order to prevent the water-based inks from being dried.

In the ink-jet recording apparatus 1 of this embodiment, the four ink cartridges 2 are carried on one carriage 5 together with the head unit 4. However, the present teaching is not limited to this. In the ink jet recording apparatus described above, the respective four ink cartridges 2 may be carried on any carriage distinctly from the head unit 4. Alternatively, the respective four ink cartridges 2 may be arranged and fixed in the ink-jet recording apparatus without being carried on the carriage 5. In the modes as described above, for example, the respective four ink cartridges 2 are connected to the head unit 4 carried on the carriage 5 by tubes or the like, and each of the water-based inks is supplied from one of the respective four ink cartridges 2 to the head unit 4.

The ink jet recording, which uses the ink jet recording apparatus 1, is carried out, for example, as follows. At first, a recording paper P is supplied from a paper-feeding cassette (not shown) provided in the ink-jet recording apparatus 1 on a side portion or lower portion thereof. The recording paper P is introduced between the ink-jet head 3 and the platen roller 7. A predetermined recording is performed on the introduced recording paper P with the water-based ink(s) discharged from the ink-jet head 3. In the water-based ink of the present teaching, since the viscosity increases after the short-term drying and the long-term drying are further suppressed compared with conventional water-based inks, it is possible to discharge the water-based ink from the ink jet head 3 stably. The recording paper sheet P for which the recording has been performed is discharged from the ink jet recording apparatus 1. In FIG. 1, illustrations of the paper-feeding mechanism and paper-discharging mechanism for the recording paper sheet P are omitted.

The apparatus shown in FIG. 1 adopts the serial type ink jet head. However, the present teaching is not limited to this. The ink-jet recording apparatus may be an apparatus which adopts a line type ink jet head.

EXAMPLES

Next, Examples, Comparative Examples, and Reference Examples of the present teaching will be explained. Note that the present teaching is not limited to and is not restricted by Examples, Comparative Examples, and Reference Examples which will be described below.

Examples 1-1 to 2, Comparative Examples 1-1 to 3-3, and Reference Examples 3-4 to 3-6

Components except for a self-dispersible pigment, which were included in the Water-based Ink Composition (each of TABLES 1 and 2), were mixed uniformly or homogeneously; and thus an ink solvent was obtained. Subsequently, the ink solvent was added to each of the self-dispersible pigment water dispersions, followed by being mixed uniformly. After that, the obtained mixtures were each filtrated through a cellulose acetate membrane filter (pore size 3.00 μm) produced by Toyo Roshi Kaisha, Ltd., and thus the water-based inks for ink jet recording of Examples 1-1 to 2, Comparative Examples 1-1 to 3-3, and Reference Examples 3-4 to 3-6 were obtained.

The water-based inks in Examples, Comparative Examples, and Reference Examples were used to perform (a) evaluation of rate of viscosity change after evaporation in low shear area, (b) evaluation of rate of viscosity change after evaporation in high shear area, and (c) evaluation of re-dispersion property in the following methods.

(a) Evaluation of Rate of Viscosity Change after Evaporation in Low Shear Area 5 g of each of the water-based inks in Examples and Comparative Examples was poured into an open vial (opening size (diameter): 20.2 mm). The open vial was stored in a thermostatic chamber for 5 days at a temperature of 60 degrees Celsius and a relative humidity of 40%. Then, the viscosity of each of the water-based inks in the open vial after the storage was measured by using a viscometer (produced by TA instruments, product name: AR-G2, cone-plate geometry (diameter: 40 mm, cone angle: 1°) was used as geometry) under the conditions in which a shear velocity was 10 sec$^{-1}$ and a measurement temperature was 25 degrees Celsius. For each of the water-based inks, of which colorant was a sulfonic acid group-modified self-dispersible carbon black, in Examples 1-1 to 1-10 and Comparative Examples 1-1, 1-2, and 1-4, a relative value (rate of viscosity change) of the viscosity after the evaporation in the low shear area was calculated on the assumption that the viscosity after the evaporation in the low shear area of Comparative Example 1-3, in which the humectant was made only of glycerol, was set as 1. Then, each of the relative values was evaluated in accordance with the following evaluation criteria. Further, for each of the water-based inks, of which colorant was a sulfonic acid group-modified C.I. pigment red 122, in Example 2 and Comparative Example 2-1, a relative value (rate of viscosity change) of the viscosity after the evaporation in the low shear area was calculated on the assumption that the viscosity after the evaporation in the low shear area of Comparative Example 2-2, in which the humectant was made only of the glycerol, was set as 1. Then, each of the relative values was evaluated in accordance with the following evaluation criteria. Furthermore, for each of the water-based inks, of which colorant was a carboxylic acid group-modified self-dispersible carbon black, in Comparative Examples 3-1 and 3-2 and Reference Examples 3-4 to 3-6, a relative value (rate of viscosity change) of the viscosity after the evaporation in the low shear area was calculated on the assumption that the viscosity after the evaporation in the low shear area of Comparative Example 3-3, in which the humectant was made only of the glycerol, was set as 1. Then, each of the relative values was evaluated in accordance with the following evaluation criteria.

<Evaluation Criteria for Evaluation of Rate of Viscosity Change after Evaporation in Low Shear Area> A: Rate of viscosity change after evaporation in low shear area was less than 0.9 B: Rate of viscosity change after evaporation in low shear area was not less than 0.9 and less than 1 C: Rate of viscosity change after evaporation in low shear area was not less than 1

(b) Evaluation of Rate of Viscosity Change after Evaporation in High Shear Area

The viscosity of each of the water-based inks in the open vial was measured in the similar manner as the evaluation of rate of viscosity change after the evaporation in the low shear area, except that the shear velocity of the viscometer was set to 100 sec$^{-1}$. For each of the water-based inks, of which colorant was the sulfonic acid group-modified self-dispersible carbon black, in Examples 1-1 to 1-10 and Comparative Examples 1-1, 1-2, and 1-4, a relative value (rate of viscosity change) of the viscosity after the evaporation in the high shear area was calculated on the assumption that the viscosity after the evaporation in the high shear area of Comparative Example 1-3, in which the humectant was made only of the glycerol, was set as 1. Then, each of the relative values was evaluated in accordance with the following evaluation criteria. Further, for each of the water-based inks, of which colorant was the sulfonic acid group-modified C.I. pigment red 122, in Example 2 and Comparative Example 2-1, a relative value (rate of viscosity change) of the viscosity after the evaporation in the high shear area was calculated on the assumption that the viscosity after the evaporation in the high shear area of Comparative Example 2-2, in which the humectant was made only of the glycerol, was set as 1. Then, each of the relative values was evaluated in accordance with the following evaluation criteria. Furthermore, for each of the water-based inks, of which colorant was a carboxylic acid group-modified self-dispersible carbon black, in Comparative Examples 3-1 and 3-3 and Reference Examples 3-4 to 3-6, a relative value (rate of viscosity change) of the viscosity after the evaporation in the high shear area was calculated on the assumption that the viscosity after the evaporation in the high shear area of Comparative Example 3-2, in which the humectant was made only of the diethylene glycol, was set as 1. Then, each of the relative values was evaluated in accordance with the following evaluation criteria.

<Evaluation Criteria for Evaluation of Rate of Viscosity Change after Evaporation in High Shear Area> A: Rate of viscosity change after evaporation in high shear area was less than 0.9 B: Rate of viscosity change after evaporation in high shear area was not less than 0.9 and less than 1 C: Rate of viscosity change after evaporation in high shear area was not less than 1

(c) Re-Dispersion Property Evaluation

The water-based inks of Examples, Comparative Examples, and Reference Examples were dripped each in amount of 12 μL onto glass slides, respectively. Subsequently, the glass slides were stored for duration of one day under an environment of temperature: 60 degrees Celsius and relative humidity: 40%, and thus the water-based inks were evaporated and dried. 1 mL of pure or purified water was dripped onto each of solid matters after the storage. With respect to the evaluation samples prepared in such a manner, presence or absence of residue was observed visually and by using a X200-magnification optical microscope. The re-dispersion property was evaluated in accordance with the following evaluation criteria.

<Evaluation Criteria for Re-Dispersion Property>
A+: Solid matter was re-dispersed uniformly (dissolved and dispersed in pure water) upon dripping of pure water, and any residue was not observed visually and microscopically.
A: Solid matter was re-dispersed uniformly upon dripping of pure water, and any residue was not observed visually but some residue was observed microscopically. B: Although solid matter was re-dispersed uniformly upon dripping of pure water, some residue was observed visually and microscopically.

Ink compositions and evaluation/measurement results of the water-based inks of Examples, Comparative Examples, and Reference Examples are shown in Tables 1 and 2.

TABLE 1

|  |  | EXAMPLES | | | | | | |
| --- | --- | --- | --- | --- | --- | --- | --- | --- |
|  |  | 1-1 | 1-2 | 1-3 | 1-4 | 1-5 | 1-6 | 1-7 |
| Water-based Ink Composition (% by weight) | CAB-O-JET (trade name) 200 (*1) | 26.7 (4.0) | 26.7 (4.0) | 26.7 (4.0) | 26.7 (4.0) | 26.7 (4.0) | 26.7 (4.0) | 26.7 (4.0) |
|  | CAB-O-JET (trade name) 260M (*2) | — | — | — | — | — | — | — |
|  | Glycerol (Gly) | 22.25 | 23.00 | 23.00 | 23.00 | 24.00 | 24.50 | 24.75 |
|  | Diethylene glycol (DEG) | 2.75 | 2.00 | 2.00 | 2.00 | 1.00 | 0.50 | 0.25 |
|  | 2-n-butyl-2-ethyl-1,3-propanediol | — | — | — | — | — | — | — |
|  | Dipropylene glycol-n-propylether | 2.00 | 2.00 | 0.50 | 6.00 | 2.00 | 2.00 | 2.00 |
|  | Triethylene glycol-n-butyl ether | — | — | — | — | — | — | — |
|  | Tetraethylene glycol-n-butyl ether | — | — | — | — | — | — | — |
|  | Olfine (trade name) E1010 (*4) | 0.20 | 0.20 | 0.20 | 0.20 | 0.20 | 0.20 | 0.20 |
|  | Water | balance | balance | balance | balance | balance | balance | balance |
| DEG/(Gly + DEG) |  | 0.11 | 0.08 | 0.08 | 0.08 | 0.04 | 0.02 | 0.01 |
| Evaluation/ Measurement | Viscosity after evaporation in low shear area (mPa · S) | 828 | 609 | 622 | 645 | 689 | 810 | 883 |
|  | Viscosity after evaporation in high shear area (mPa · S) | 230 | 183 | 190 | 197 | 220 | 260 | 302 |
|  | Rate of viscosity change after evaporation in low shear area | 0.88 A | 0.65 A | 0.66 A | 0.73 A | 0.73 A | 0.86 A | 0.94 B |
|  | Rate of viscosity change after evaporation in high shear area | 0.72 A | 0.57 A | 0.59 A | 0.69 A | 0.69 A | 0.81 A | 0.94 B |
|  | Re-dispersion property | A+ | A+ | A | A | A+ | A+ | A+ |

|  |  | EXAMPLES | | | | COMPARATIVE EXAMPLES | | |
| --- | --- | --- | --- | --- | --- | --- | --- | --- |
|  |  | 1-8 | 1-9 | 1-10 | 2 | 1-1 | 1-2 | 1-3 |
| Water-based Ink Composition (% by weight) | CAB-O-JET (trade name) 200 (*1) | 26.7 (4.0) | 26.7 (4.0) | 26.7 (4.0) | — | 26.7 (4.0) | 26.7 (4.0) | 26.7 (4.0) |
|  | CAB-O-JET (trade name) 260M (*2) | — | — | — | 40.0 (4.0) | — | — | — |
|  | Glycerol (Gly) | 23.00 | 23.00 | 23.00 | 23.00 | — | 22.00 | 25.00 |
|  | Diethylene glycol (DEG) | 2.00 | 2.00 | 2.00 | 2.00 | 25.00 | 3.00 | — |
|  | 2-n-butyl-2-ethyl-1,3-propanediol | — | — | — | — | — | — | — |
|  | Dipropylene glycol-n-propylether | — | — | — | 2.00 | — | 2.00 | 2.00 |
|  | Triethylene glycol-n-butyl ether | 1.50 | 5.00 | — | — | — | — | — |
|  | Tetraethylene glycol-n-butyl ether | — | — | 3.00 | — | — | — | — |
|  | Olfine (trade name) E1010 (*4) | 0.20 | 0.20 | 0.20 | 0.20 | 0.20 | 0.20 | 0.20 |
|  | Water | balance | balance | balance | balance | balance | balance | balance |
| DEG/(Gly + DEG) |  | 0.08 | 0.08 | 0.08 | 0.08 | 1.00 | 0.12 | 0 |
| Evaluation/ Measurement | Viscosity after evaporation in low shear area (mPa · S) | 662 | 651 | 635 | 1678 | 1940 | 965 | 940 |
|  | Viscosity after evaporation in high shear area (mPa · S) | 180 | 215 | 202 | 411 | 1550 | 247 | 321 |
|  | Rate of viscosity change after evaporation in low shear area | 0.70 A | 0.69 A | 0.68 A | 0.85 A | 2.06 C | 1.03 C | ref — |

TABLE 1-continued

|  |  |  |  |  |  |  |  |  |
|---|---|---|---|---|---|---|---|---|
| Rate of viscosity change after evaporation in high shear area | | 0.56 A | 0.67 A | 0.63 A | 0.85 A | 4.83 C | 0.77 A | ref — |
| Re-dispersion property | | A+ | A | A+ | A+ | B | A+ | A+ |

|  |  | COMPARATIVE EXAMPLES | | |
|---|---|---|---|---|
|  |  | 1-4 | 2-1 | 2-2 |
| Water-based Ink Composition (% by weight) | CAB-O-JET (trade name) 200 (*1) | 26.7 (4.0) | — | — |
|  | CAB-O-JET (trade name) 260M (*2) | — | 40.0 (4.0) | 40.0 (4.0) |
|  | Glycerol (Gly) | 23.00 | — | 25.00 |
|  | Diethylene glycol (DEG) | 2.00 | 25.00 | — |
|  | 2-n-butyl-2-ethyl-1,3-propanediol | 2.00 | — | — |
|  | Dipropylene glycol-n-propylether | — | — | 2.00 |
|  | Triethylene glycol-n-butyl ether | — | — | — |
|  | Tetraethylene glycol-n-butyl ether | — | — | — |
|  | Olfine (trade name) E1010 (*4) | 0.20 | 0.20 | 0.20 |
|  | Water | balance | balance | balance |
| DEG/(Gly + DEG) | | 0.08 | 1.00 | 0 |
| Evaluation/ Measurement | Viscosity after evaporation in low shear area (mPa·S) | 1430 | 2480 | 1973 |
|  | Viscosity after evaporation in high shear area (mPa·S) | 805 | 685 | 483 |
|  | Rate of viscosity change after evaporation in low shear area | 1.52 C | 1.25 C | ref — |
|  | Rate of viscosity change after evaporation in high shear area | 2.51 C | 1.42 C | ref — |
|  | Re-dispersion property | — | B | A+ |

(*1): Self-dispersible pigment modified by sufonic acid group, produced by Cabot Specialty Chemicals; carbon black concentration: 15% by weight, number in parenthesis indicates pigment solid content amount
(*2): Self-dispersible pigment modified by sufonic acid group, produced by Cabot Specialty Chemicals; C.I. pigment red 122 concentration: 10% by weight, number in parenthesis indicates pigment solid content amount
(*4): Acethylene diol ethylene oxide (10 mol) adduct, produced by Nissin Chemical Industry Co., Ltd

TABLE 2

|  |  | COMPARATIVE EXAMPLES | | | REFERENCE EXAMPLES | | |
|---|---|---|---|---|---|---|---|
|  |  | 3-1 | 3-2 | 3-3 | 3-4 | 3-5 | 3-6 |
| Water-based Ink Composition (% by weight) | CAB-O-JET (trade name) 300 (*5) | 26.7 (4.0) | 26.7 (4.0) | 26.7 (4.0) | 26.7 (4.0) | 26.7 (4.0) | 26.7 (4.0) |
|  | Glycerol (Gly) | 24.0 | — | 25.00 | 5.00 | 6.00 | 5.00 |
|  | Diethylene glycol (DEG) | 1.0 | 25.0 | — | 20.00 | 19.00 | 20.00 |
|  | Dipropylene glycol-n-propylether | 2.00 | 2.00 | 2.00 | 1.00 | 2.00 | — |
|  | Triethylene glycol-n-butyl ether | — | — | — | — | — | 2.00 |
|  | Olfine (trade name) E1010 (*4) | 0.20 | 0.20 | 0.20 | 0.20 | 0.20 | 0.20 |
|  | Water | balance | balance | balance | balance | balance | balance |
| DEG/(Gly + DEG) | | 0.04 | 1.00 | 0 | 0.80 | 0.76 | 0.80 |
| Evaluation/ Measurement | Viscosity after evaporation in low shear area (mPa·S) | 276 | 610 | 202 | 102 | 99 | 122 |
|  | Viscosity after evaporation in high shear area (mPa·S) | 243 | 121 | 169 | 74 | 74 | 68 |
|  | Rate of viscosity change after evaporation in low shear area (obtained with reference to Comparative Example 3-3) | 1.37 C | 3.02 C | ref. — | 0.50 A | 0.49 A | 0.60 A |
|  | Rate of viscosity change after evaporation in high shear area (obtained with reference to Comparative Example 3-2) | 2.01 C | ref. — | 1.40 C | 0.61 A | 0.61 A | 0.56 A |
|  | Re-dispersion property | — | — | A | A | A+ | A+ |

(*4): Acethylene diol ethylene oxide (10 mol) adduct, produced by Nissin Chemical Industry Co., Ltd
(*5): Self-dispersible carbon black modified by carboxylic acid group, produced by Cabot Specialty Chemicals; carbon black concentration: 15% by weight, number in parenthesis indicates pigment solid content amount As shown in TABLE 1, for each of the water-based inks, of which colorant was the sulfonic acid group-modified self-dispersible carbon black, in Examples 1-1 to 1-10 and Comparative Examples 1-1, 1-2, and 1-4, both the rate of viscosity change after the evaporation in the low shear area and the rate of viscosity change after the evaporation in the high shear area were less than 1 and viscosity increases after the short-term drying and the long-term drying were suppressed in each of the water-based inks of Examples 1-1 to 1-10. In each of the water-based inks of Examples 1-1 to 1-6 and 1-8 to 1-10 in which the glycerol and the diethylene glycol were blended to satisfy the condition (ii), the rate of viscosity change after the evaporation in the low shear area and the rate of viscosity change after the evaporation in the high shear area were less than 0.9 and they were especially superior. In each of the water-based inks of Examples 1-1 to 1-10 in which the alkylene glycol monoalkyl ether as the penetrant was contained, the result of the evaluation of the re-dispersion property was also superior. Among them, the result of the evaluation of the re-dispersion property was especially superior in each of the water-based inks of Examples 1-1, 1-2, 1-5 to 1-8, and 1-10 in which the blending amount of the alkylene glycol monoalkyl ether was 1.5% by weight to 3% by weight.

On the other hand, in each of the water-based inks of Comparative Examples 1-1 and 1-2 in which the blending ratio of the glycerol and the diethylene glycol did not meet the condition (i), both of or one of the rate of viscosity change after the evaporation in the low shear area and the rate of viscosity change after the evaporation in the high shear area was/were not less than 1 and the viscosity increase after the drying could not be suppressed. Further, in the water-based ink of Comparative Example 1-1 in which the alkylene glycol monoalkyl ether was not contained, the result of the evaluation of the re-dispersion property was also inferior. Furthermore, in the water-based ink of Comparative Example 1-4 in which 2-n-butyl-2-ethyl-1,3-propanediol was blended instead of the alkylene glycol monoalkyl ether as the penetrant, both the rate of viscosity change after the evaporation in the low shear area and the rate of viscosity change after the evaporation in the high shear area were not less than 1.

For each of the water-based inks, of which colorant was the sulfonic acid group-modified C.I. pigment red 122, in Example 2 and Comparative Example 2-1, both the rate of viscosity change after the evaporation in the low shear area and the rate of viscosity change after the evaporation in the high shear area were less than 0.9 in the water-based ink of Example 2 in which the glycerol and the diethylene glycol were blended to satisfy the condition (ii) and thus the rate of viscosity change after the evaporation in the low shear area and the rate of viscosity change after the evaporation in the high shear area were especially superior in Example 2. Further, the result of the evaluation of the re-dispersion property was also especially superior in the water-based ink of Example 2 in which the alkylene glycol monoalkyl ether was contained at 2.00% by weight. Meanwhile, in the water-based ink of Comparative Example 2-1 in which the blending ratio of the glycerol and the diethylene glycol did not meet the condition (i) and the alkylene glycol monoalkyl ether was not contained, both the rate of viscosity change after the evaporation in the low shear area and the rate of viscosity change after the evaporation in the high shear area were not less than 1 and the result of the evaluation of the re-dispersion property was inferior.

In each of the water-based inks, of which colorant was the carboxylic acid group-modified self-dispersible carbon black, in Comparative Example 3-1 and Reference Examples 3-4 to 3-6, both the rate of viscosity change after the evaporation in the high shear area and the rate of viscosity change after the evaporation in the low shear area were not less than 1 in Comparative Example 3-1 even though the blending ratio of the glycerol and the diethylene glycol satisfied the condition (i). Thus, the viscosity increase after the drying could not be suppressed in the water-based ink of Comparative Example 3-1. On the other hand, both the rate of viscosity change after the evaporation in the low shear area and the rate of viscosity change after the evaporation in the high shear area were less than 1 in each of the water-based inks of Reference Examples 3-4 to 3-6, even though the blending ratio of the glycerol and the diethylene glycol did not satisfy the condition (i). Thus, viscosity increases after the short-term drying and the long-term drying could be suppressed in each of the water-based inks of Reference Examples 3-4 to 3-6. From the results of Comparative Example 3-1 and Reference Examples 3-4 to 3-6, it is assumed that the condition (i) and condition (ii) for the relation between the blending amount of glycerol and the blending amount of diethylene glycol are conditions as follows. That is, in a case that the sulfonic acid group-modified self-dispersible pigment is used as the colorant, the effect of suppressing the viscosity increase of the water-based ink after the short-term drying and the viscosity increase of the water-based ink after the long-term drying can be obtained. In a case that any colorant other than the sulfonic acid group-modified self-dispersible pigment is used, even when the condition (i) or condition (ii) is satisfied, the effect similar to that of the present teaching may not be obtained.

As described above, in the water-based ink of the preset teaching, viscosity increases after a short-term drying and a long-term drying are suppressed. The way of use of the water-based ink of the present teaching is not specifically limited, and the water-based ink is widely applicable to various types of ink jet recording.

What is claimed is:

1. A water-based ink for ink-jet recording, comprising:
a self-dispersible pigment modified by sulfonic acid group;
glycerol;
diethylene glycol;
a penetrant; and
water,
wherein the glycerol and the diethylene glycol satisfy the following condition (i):

$$0.01 \leq DEG/(Gly+DEG) \leq 0.08 \qquad (i)$$

in the condition (i), Gly represents an amount of the glycerol in the water-based ink (% by weight); and DEG represents an amount of the diethylene glycol in the water-based ink (% by weight).

2. The water-based ink for ink jet recording according to claim 1,
wherein the glycerol and the diethylene glycol satisfy the following condition (ii):

$$0.02 \leq DEG/(Gly+DEG) \leq 0.08 \qquad (ii).$$

3. The water-based ink for ink jet recording according to claim 1, wherein the penetrant is alkylene glycol monoalkyl ether.

4. The water-based ink for ink jet recording according to claim 3, wherein the alkylene glycol monoalkyl ether is contained in the water-based ink in an amount of 1.5 % by weight to 3 % by weight.

5. The water-based ink for ink jet recording according to claim 1, wherein the water-based ink does not contain a dye.

6. The water-based ink for ink jet recording according to claim 1, wherein the water-based ink contains only the self-dispersible pigment modified by sulfonic acid group as a colorant.

7. The water-based ink for ink jet recording according to claim 3, wherein the alkylene glycol monoalkyl ether is represented by the following general formula (1):

$$R^1O\text{---}(R^2O)_n\text{---}H \qquad (1)$$

in the general formula (1), $R^1$ is an unsubstituted straight-chain alkyl group having 1 to 6 carbon atoms; $R^2$ is an unsubstituted straight-chain alkylene group having 2 to 3 carbon atoms; and n is an integer of 1 to 4.

8. The water-based ink for ink jet recording according to claim 3, wherein the alkylene glycol monoalkyl ether is at least one selected from the group consisting of dipropylene glycol n-propyl ether, triethylene glycol n-butyl ether, and tetraethylene glycol n-butyl ether.

9. The water-based ink for ink jet recording according to claim 1, wherein a total amount of the self-dispersible pigment modified by sulfonic acid group, the glycerol, the diethylene glycol, the penetrant, and water in the water-based ink is 90 % by weight to 100 % by weight.

10. The water-based ink for ink jet recording according to claim 1, wherein a total amount of the glycerol and the diethylene glycol in the water-based ink is 10 % by weight to 60 % by weight.

11. The water-based ink for ink jet recording according to claim 1, wherein the glycerol is contained in the water-based ink in an amount of 10 % by weight to 55 % by weight.

12. The water-based ink for ink jet recording according to claim 1, wherein the diethylene glycol is contained in the water-based ink in an amount of not more than 10 % by weight.

13. An ink cartridge containing the water-based ink for ink-jet recording as defined in claim 1.

14. An ink jet recording apparatus comprising:
an ink accommodating section in which the water-based ink for ink jet recording as defined in claim 1 is accommodated; and
an ink discharge mechanism which is configured to discharge the water-based ink for ink-jet recording accommodated in the ink accommodating section.

15. An ink jet recording method comprising:
preparing a recording medium; and
discharging the water-based ink for ink jet recording as defined in claim 1 onto the recording medium.

16. The water-based ink for ink jet recording according to claim 1, wherein the following condition (A) or condition (B) is satisfied:
Condition (A): the water-based ink is black ink, a viscosity of the water-based ink after evaporation in a low shear area (a shear velocity: 10 $sec^{-1}$) is not more than 883 mPa·s, and a viscosity of the water-based ink after evaporation in high shear area (a shear velocity: 100 $sec^{-1}$) is not more than 302 mPa·s Condition (B): the water-based ink is magenta ink, a viscosity of the water-based ink after evaporation in a low shear area (a shear velocity: 10 $sec^{-1}$) is not more than 1678mPa·s, and a viscosity of the water-based ink after evaporation in a high shear area (a shear velocity: 100 $sec^{-1}$) is not more than 411 mPa·s.

* * * * *